2 Sheets—Sheet 1.
H. HUBER.
Bretzel-Machine.
No. 223,917. Patented Jan. 27, 1880.
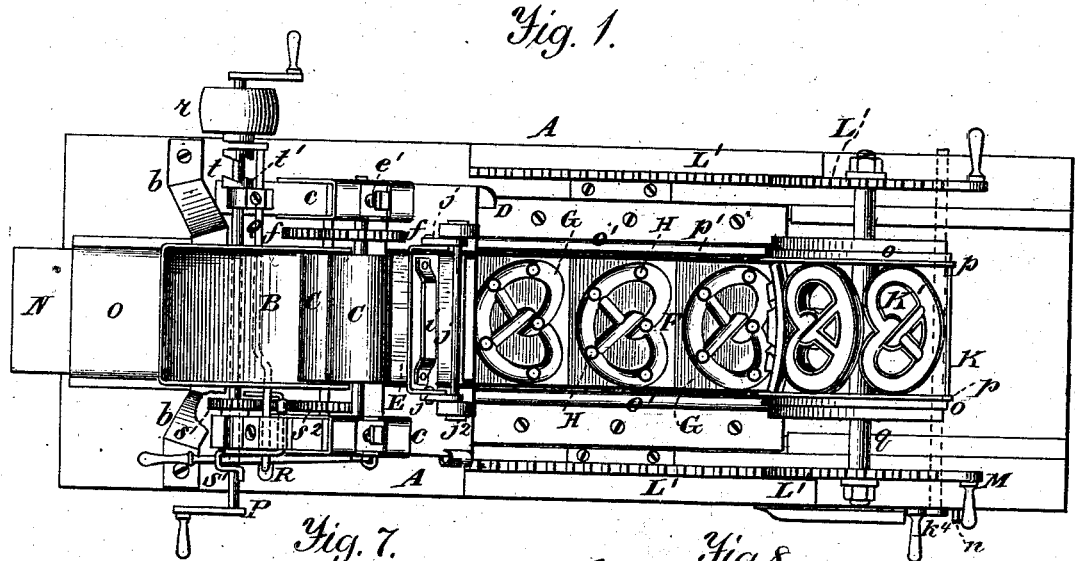
Fig. 1.
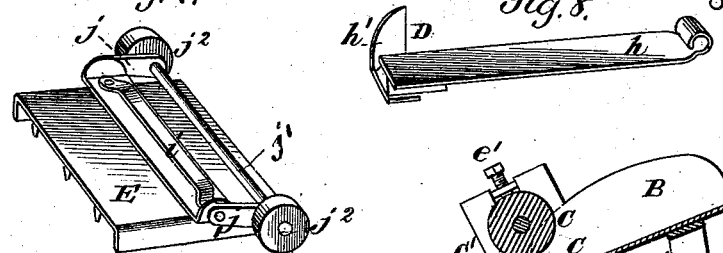
Fig. 7. Fig. 8.
Fig. 2.
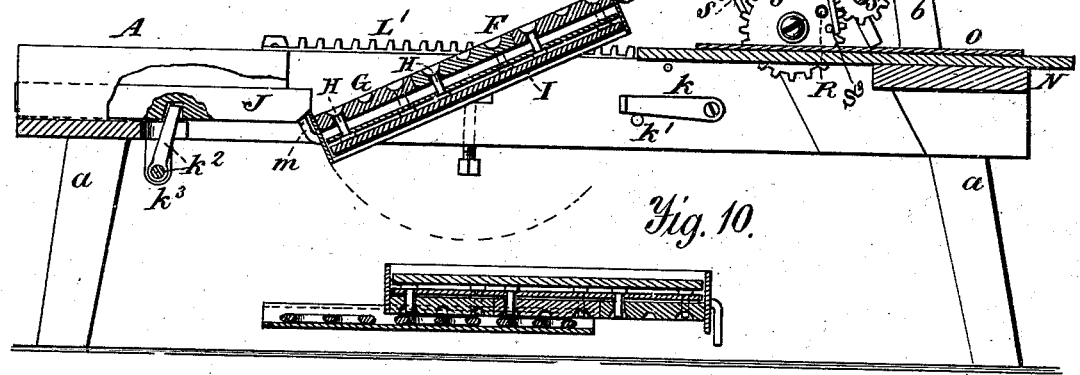
Fig. 10.
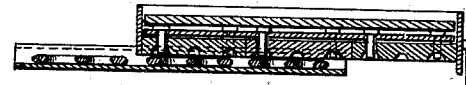
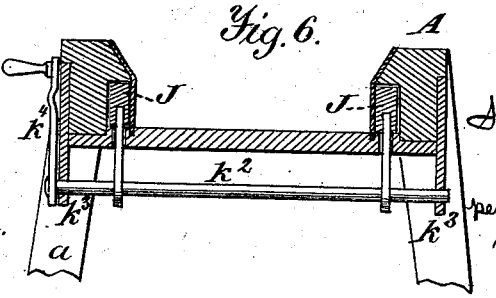
Fig. 6.
Witnesses.
A. Ruppert,
James H. Lange.
Henry Huber
Inventor:
per Edson Bro's,
Attorneys.
N. PETERS, PHOTO-LITHOGRAPHER, WASHINGTON, D. C.

H. HUBER.
Bretzel-Machine.

No. 223,917. Patented Jan. 27, 1880.

Witnesses.
A. Ruppert.
James H. Lange.

Henry Huber.
Inventor.
per Edson Bro's
Attorneys.

UNITED STATES PATENT OFFICE.

HENRY HUBER, OF CRESTLINE, OHIO.

BRETZEL-MACHINE.

SPECIFICATION forming part of Letters Patent No. 223,917, dated January 27, 1880.

Application filed August 5, 1879.

*To all whom it may concern:*

Be it known that I, HENRY HUBER, of Crestline, in the county of Crawford and State of Ohio, have invented certain new and useful Improvements in Bretzel-Machines; and I do hereby declare that the following is a full, clear, and exact description of the invention, which will enable others skilled in the art to make and use the same, reference being had to the accompanying drawings, and to letters of reference marked thereon, which form a part of this specification, and in which—

Figure 3:
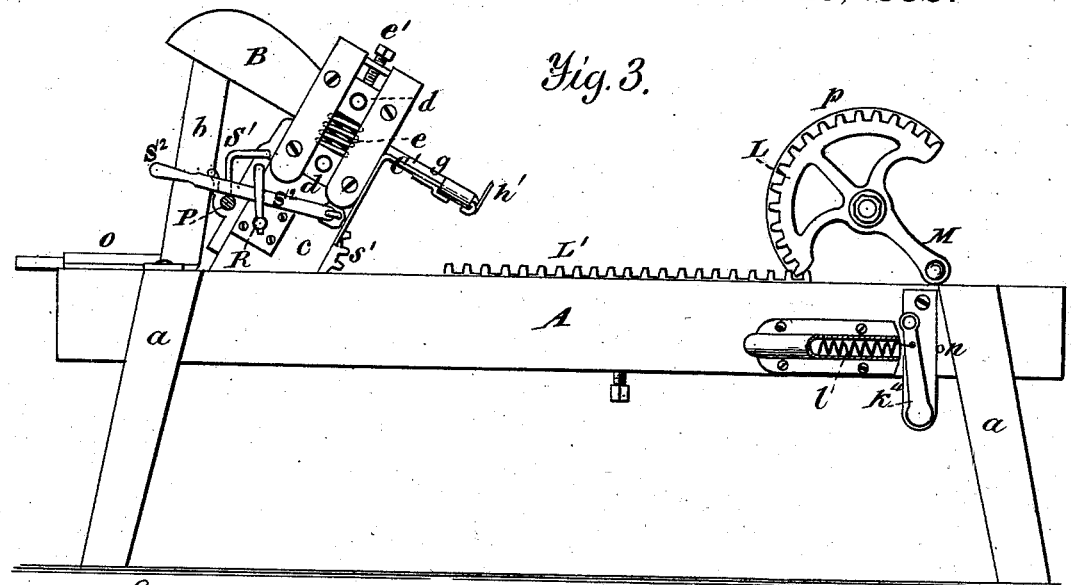
Figures 4, 5:
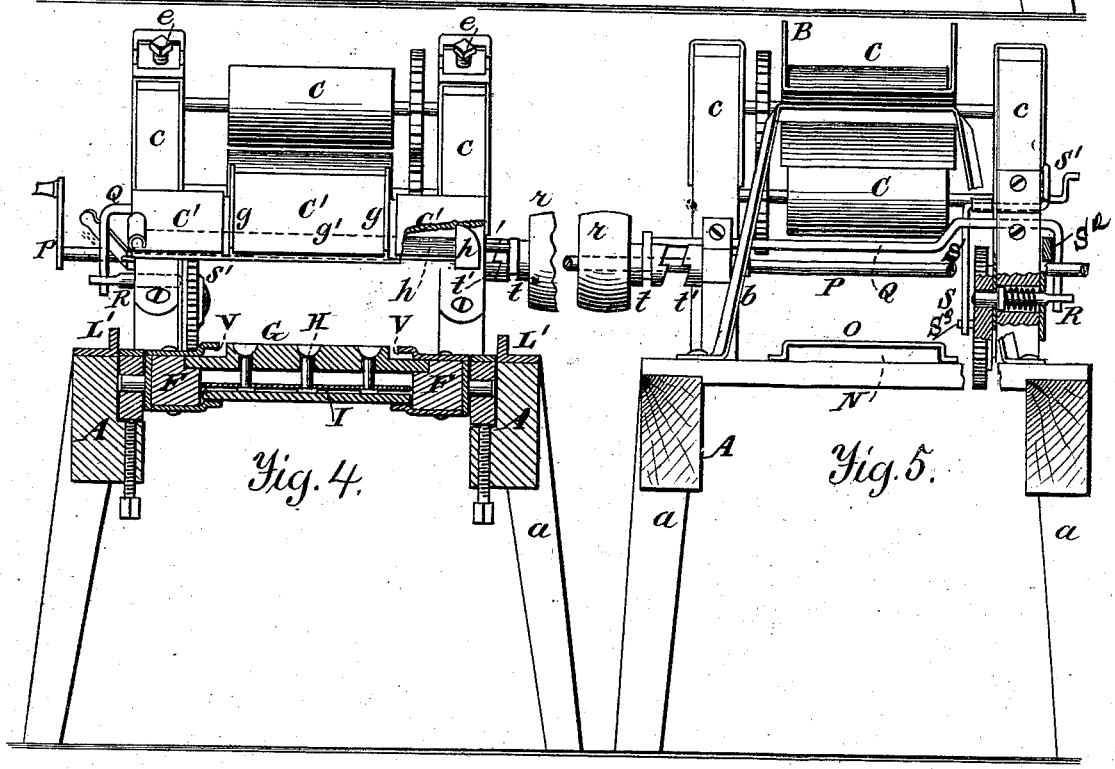
Figure 9:
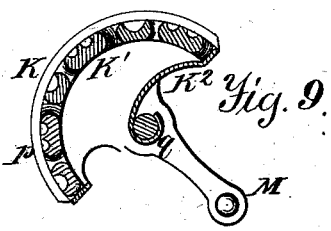

Figure 1 is a plan view of my improved bretzel-machine with the die-bed in a horizontal position. Fig. 2 is a vertical longitudinal section of the same with the die-bed in an inclined position in line with the chute or trough. Fig. 3 is a side elevation with the rocker-die with its handles resting on the supporting-frame, which position it is placed in while feeding the dough to the die-bed, and in readiness for stamping out the bretzels. Fig. 4 is a transverse section of the same, taken on line $x\,x$ of Fig. 1, and Fig. 5 is a front elevation thereof, partly in section. Fig. 6 is a transverse section through the frame A, showing bars J and their operating devices. Fig. 7 is a detached perspective view of the dough-feeding device. Fig. 8 is a perspective view of the knife for cutting the dough. Fig. 9 is a detached sectional view of the die-holder K. Fig. 10 is an inverted longitudinal detached section of the bed-plate, showing the pan partially withdrawn.

This invention appertains to certain improvements in bretzel-machines, the principal object of which is to expedite and simplify the operation of making the bretzels or jumbles, and will be fully understood from the following description and claims.

In the accompanying drawings, A marks the supporting-frame, mounted on legs $a\,a$. B is the feeding trough or chute, secured upon supports $b$, fastened to the frame A at one end in an inclined position.

At the lower or forward end of the trough B are arranged the feed-rolls C C, disposed one above the other in a slightly forwardly-inclined position, and journaled in oblique posts $c$, their shafts bearing in metallic blocks $d$, fitted in vertical slots in said posts.

The upper blocks or bearings are supported on springs $e$, and are provided with adjusting-screws $e'$. The screws and springs permit the upper roll to be properly distanced from the other roll to gage the thickness of feeding of the dough between them. These rolls, or rather their shafts, are provided with wheels or pinions $f$, meshing with each other.

$C'$ is a forward inclined extension of the chute or trough B, fixed to the posts $c$, with guiding-flanges $g\,g$ on its central part, $g'$, extending up flush with the upper surface of the lower roll.

D is a knife, with its sliding bar $h$ fitted to slide in a groove in the under side of the extension $C'$, and its blade $h'$ so attached to said bar as to extend up at the lower edge of said extension, and thus serve, when the handled bar $h$ is drawn forward, to sever the dough remaining on the extension $C'$ of the dough-trough from that fed on the die-bed.

E is a plate with downwardly-projecting flanges at its sides, and its under side provided with projections. The upper side of this plate or device is provided with a handle, preferably in the form of a bail, $i$, to be grasped by the hand for moving the plate so as to cause it to feed the dough down the extension $C'$ onto the die-bed. To the sides of this plate, which have flanges entering and guided in grooves alongside of the flanges of the extension $C'$, are hung short arms $j$, provided with a shaft, $j'$, with rolls or trucks $j^2$. These facilitate the movement of the dough-feeding device E. This device also serves to guide the side edges of the dough simultaneously with the feeding of the same down the extension $C'$ onto the die-bed.

F is the die-bed, about centrally hung in the side pieces of the frame, so as to turn therein, when desired, by pressing on one end of the said bed. Let into the upper surface of this bed is a number of dies, G, having the form of a bretzel or jumble, to give the desired impression to the under side of the dough fed thereon.

Fitted to slide in apertures distributed throughout the dies are expelling-studs H, with their inner or lower ends provided, within a chamber in the die-bed, with heads to confine them in place in a sliding position. These studs pass through a plate, I, which serves, when the die-bed is face upward, as a weight to sink the free ends of the studs H below the face of the dies after the expulsion of the bretzels or jumbles.

J J are two slide-bars, fitted in sockets in the side pieces of the frame A, with their free ends extended under and supporting one end of the die-bed, its other end being supported on the right-angled ends of supports or plates $k$, pivoted to the inner sides of the frame A, and with their free ends resting on studs or pins $k'$, projecting from the same side of the frame. The object of pivoting these right-angled supports $k$ is to permit them to swing out of the way of the revolving die-bed as the latter is revolved. They return to their original position by gravity, in readiness for supporting that end of the bed.

The slide-bars J J are rigidly connected to a rock-shaft, $k^2$, hung in pendants $k^3$ depending in a fixed position from the frame A. To one end of this shaft is connected a cranked handle, $k^4$, which is connected, in turn, to an inclosed spring, $l$, serving to hold the slide-bars J J at their free ends under the end of the die-bed. The said ends of the slide-bars J are provided with downwardly-projecting or angular projections $m$, at which point these bars are also preferably provided with oblique edges, the object of all of which is to support the die-bed in an inclined position in line with the dough-feeding trough or chute.

By pressing the crank or handle $k^4$ outwardly, or so as to draw on its holding-spring until it presses against the stop $n$ on the frame A, the free ends of the slide-bars J are disengaged from the die-bed, when the latter can be completely revolved within the frame A, or turned upside down and back to its original position.

By simply pressing slightly on the crank $k^4$ the die-bed can be tilted so as to cause its end to catch on the angular projections $m$ and under the corresponding edges of the bars J, and be there held in line with the dough trough or chute.

K is a segmental form of die-holder, with its convexity provided with dies K' corresponding to the dies on the die-bed, but with interstices for the passage of the scraps into the holder, from which they are emptied through an opening therein. This holder is weighted and partially inclosed, as at K², to render it more effective in operation. Furthermore, its convex surface or face is provided with treads $o$ $o$, resting on a track, $o'$ $o'$, on the die-bed, and with flanges $p$, fitting in grooves $p'$ in said bed. This arrangement obviates the defacing of the dies, and provides a bearing or surface of contact between the parts. This die-holder is provided with a central shaft, $q$, fixed to its upper side and projecting beyond each side of said holder, which projecting portions are provided with toothed or cogged segments L, meshing with a toothed track, L', fastened in the frame A. To the upper sides of these cogged segments L' are attached handles or levers M, by which the die-holder is rocked or passed over the upper surface of the dough, to impart the desired impression to that side of the forming bretzels or jumbles.

The die-holder is adjusted in the position shown in Fig. 3, with its handles resting on the supporting-frame A, and then reciprocated on the dough to effect the stamping of the same into bretzels or jumbles. The scraps received into the rocker or holder K are emptied therefrom when it is returned to the position shown in Fig. 3. At the other or forward end of the frame A is a longitudinal table or board, N, upon which the pan O is adapted to slide bottom upward. This table extends under and to the lower end of the dough-feeding chute.

P is a shaft for driving the feed-rolls, journaled in boxes fastened to posts $c$. This shaft may be driven by hand-power by turning it by the cranks attached to its ends or by belt, the belt passing around a pulley, $r$, on said shaft and connecting with a suitable motor.

The shaft P has a pinion, $s$, gearing with a second larger pinion, $s'$, engaging with a third pinion, $s^2$, on the shaft of the lower feed-roll, through which motion is transmitted from said shaft to the feed-rolls. The belt-pulley $r$ on the shaft P is provided with a grooved clutch-sleeve, $t$, adapted, under certain conditions, to engage with a fixed clutch-sleeve, $t'$, on one of the journal-boxes of the said shaft.

Q is a rod, with a fork fitting in the groove of the clutch-sleeve $t$ and extending across and in front of the posts $c$ through suitable bearings, with an upward bend in it, which bent portion extends downwardly outside of one of said posts, and is provided with an inwardly-projecting bar or pin, R, extending into and through the post $c$ on that side. The bar or pin R is adapted to enter an aperture, $u$, in the intermediate driving-wheel $s'$.

A spring arranged to act on the pin R serves to keep the pulley $r$ unclutched from the shaft P, and at the same time to cause the pin R to enter the coincident aperture of the driving-pinion $s'$.

S is a crank-bar hung in one of the posts $c$, and provided with an arm, S'. S² is a lever, also connected to the same post and extending inside of the outer end of the clutch rod or arm Q. By pulling this lever outward against the rod Q the pulley $r$ will be caused to clutch with the shaft P. Simultaneous with this action of the lever the rod Q will bring the inner arm of the bar S in contact with a pin or projection, S³, on the pinion $s'$, while the outer arm, S', will be moved under and hold the lever, retracting the pin R from the pinion $s'$. The pinion is put in motion by turning the crank P. As it continues to revolve the pin S³ will move the crank-bar S so as to free its arm S' from the lever, by which, when the pinion has completed its revolution, the pulley $r$ will become unclutched from the shaft P and the pin R allowed to enter the coincident aperture in the pinion $s'$ and arrest the motion of the machine, as desired.

By retracting the pin R from said pinion, and not clutching or coupling the belt-pulley $r$ with the shaft P, the motion of the feed-rolls will be automatically arrested after said driving-pinion has made a complete revolution or sufficient dough has been fed between the rolls upon the delivering-extension $C'$ of the trough, and from thence upon the set of dies of the die-bed. At this juncture of the feeding of the dough, the die-bed having been previously inclined in the same plane with the said extension $C'$, the device E is applied, as heretofore stated, so as to feed the dough upon the inclined die-bed, which will impress the under side of the dough into the desired shape. The die-bed is now lowered to a horizontal position, with the dough severed by the knife D from that remaining on the extension $C'$, when the die-holder or rocker K is passed over the dough, completing the stamping out of the bretzels or jumbles. The pan O is run over the bretzels or jumbles bottom upward, the edges of the pan passing in under lips or flanges $v$ $v$ on the die-bed, holding it in position thereon. Now move the lever or crank $k^4$ back against its stop, when the slide-bars J will be retracted from the die-bed, which will permit of the said bed, with the dough or bretzels and pan covering the latter, being turned face downward. Simultaneously with this movement of the die-bed the studs H will expel the bretzels or jumbles into the pan, and then, by giving the die-bed an inclined position, the pan with its contents can be removed and taken to the oven. The die-bed is now returned to an inclined position in line with the chute and delivering-extension $C'$ for a fresh supply of dough, and the same operation is repeated until the desired amount of bretzels or jumbles is made.

Having thus fully described my invention, I claim and desire to secure by Letters Patent—

1. In a bretzel or jumble machine, the combination, with a pivoted die-bed, of a pan adapted to be placed thereon, and means, substantially as described, for securing the pan in place when the die-bed is inverted, substantially as and for the purpose set forth.

2. In a bretzel or jumble machine, the combination, with the dough-feeding trough or chute, of the pivoted or hung die-bed and slide-bars, substantially as and for the purpose set forth.

3. In a bretzel or jumble machine, the combination, with the die-bed and supporting-frame, having a track and grooves on each side of the dies in said bed, of the semi-cylindrical rocker die-holder having interstices for the passage of the scraps of dough into the scrap-receiving chamber, a central shaft provided with toothed segments, and a plate, $k^2$, substantially as and for the purpose set forth.

4. In a bretzel or jumble machine, the combination, with a pivoted or hung die-bed, of the slide-bars connected to a rock-shaft supplied with a crank or handle acted on by a spring, substantially as and for the purpose set forth.

5. In a dough or bretzel machine, the combination, with its trough-delivering extension, of the knife with its bar sliding under and its blade along the edge of said extension, substantially as and for the purpose specified.

In testimony that I claim the foregoing as my own I affix my signature in presence of two witnesses.

HENRY HUBER.

Witnesses:
NATHAN JONES,
A. JUSTIN JONES.